United States Patent [19]

Meade et al.

[11] Patent Number: 5,600,198

[45] Date of Patent: *Feb. 4, 1997

[54] ELECTRIC LAMP ASSEMBLY WITH THREADED BASE PORTION

[75] Inventors: Steven L. Meade; Joseph P. Gallant, both of Lexington, Ky.

[73] Assignee: Osram Sylvania Inc., Danvers, Mass.

[*] Notice: The term of this patent shall not extend beyond the expiration date of Pat. No. 5,308,273.

[21] Appl. No.: 317,088

[22] Filed: Oct. 3, 1994

Related U.S. Application Data

[63] Continuation-in-part of Ser. No. 950,532, Sep. 23, 1992, abandoned.

[51] Int. Cl.$^6$ ................................................ H01J 5/50
[52] U.S. Cl. ................ 313/318.01; 313/25; 313/318.04; 313/318.09
[58] Field of Search ..................... 313/25, 318.01, 313/318.03, 318.04, 318.05, 318.06, 318.09; 439/611, 613, 614, 615

[56] References Cited

U.S. PATENT DOCUMENTS

| | | | |
|---|---|---|---|
| 2,014,220 | 9/1935 | Asmussen | 439/615 |
| 3,534,217 | 10/1970 | Vause et al. | 313/318.03 |
| 4,405,877 | 9/1983 | Haraden et al. | 313/318.04 |
| 4,647,809 | 3/1987 | Blaisdell et al. | 313/25 |
| 5,308,273 | 5/1994 | Meade et al. | 313/318.04 |

*Primary Examiner*—Nimeshkumar Patel

[57] ABSTRACT

There is disclosed an electric lamp assembly with a threaded base, the assembly including a lamp envelope, a threaded base, and a light source. The electric lamp with threaded base includes portions of the threaded base positioned in concavities formed on a tubular end of the lamp envelope. No melt junction, and no glues are needed in coupling the envelope and base. The coupling is strong enough to resist decoupling by hand and grows stronger with time.

11 Claims, 5 Drawing Sheets

ELECTRIC LAMP ASSEMBLY WITH THREADED BASE PORTION

CROSS-REFERENCE TO RELATED APPLICATION

This is a continuation-in-part of application Ser. No. 07/950,532, filed Sep. 23, 1992, in the names of Steven Lee Meade and Joseph Paul Gallant, now abandoned.

BACKGROUND OF THIS INVENTION

1. Field of the Invention

This invention relates to electric lamps and, more particularly, to electric lamps with threaded bases.

2. Description of the Prior Art

Tungsten halogen lamps are known in the art and have an inner capsule which contains the tungsten halogen apparatus, and an outer envelope which guards against possible non-passive fracture of the inner capsule, and shields the user from the high surface temperature of the inner capsule. The inner capsule is mounted on a frame inside the outer envelope, with the frame acting as an electrical connection for the inner capsule. Tungsten halogen lamps can produce a higher quality light, be more efficient, and have a longer life than ordinary filamented lamps.

During assembly, the frame and inner capsule are inserted in the outer envelope, and a threaded base is screwed onto the outer envelope. The threaded base pinches exterior arms of the frame against an envelope neck to make electrical contact and hold the frame in place. To make good electrical contact, and to ensure the base is not subsequently unthreaded, the frame-to-base contact has been made by a sharp point, directed in the threading direction. As the base threads over the frame, the frame points dig progressively deeper into the base. In final position, the frame points are well embedded in the base, ensuring electrical contact, and are pointed against the unthreading of the base to prevent removal of the base. Because of variations in the pointed ends, the lengths of the frame components, molded glass dimensions and similar causes, the frame ends do not always contact the base equally. The frame can then be twisted in the outer envelope, leaving the inner capsule misaligned and presenting both a cosmetic problem and a mechanical problem. The misaligned inner capsule can knock against the outer envelope during shipment and break. The life of the inner capsule may also be affected by the irregular heat flow around the adjacent outer envelope. There is thus a need for a support frame that consistently centers the inner capsule in the outer envelope.

Double envelope, tungsten halogen lamps are, in manufacture, assembled by hand threading the base to the lamp neck. The torque characteristic of lamps with pointed frame ends is not a linear force, but is an increasing, and perhaps, even an accelerating force. The high torque needed to thread the base to its final position may lead to injuries from repeated high stress of the assemblers' fingers, hands, or wrists. By reducing the diameter of the support frame wire, the support frame may be made more flexible, but a more flexible support frame allows greater sway in the assembled lamp. Greater flexibility in the support frame is also likely to result in a bent, or distorted support frame. There is then a need for a double envelope electric lamp with a low assembly torque support frame for the internal capsule that is unlikely to sway or be distorted.

Standard lamps have frequently been sealed by cementing or epoxying the threaded metal base to the outer glass envelope. Fluid or paste glues and cements are not easy to work with in an assembly line operation. Inadequate gluing may occur, allowing the base to open, while excessive gluing may leave the lamps cosmetically unacceptable. Glues and cements are also usually relatively expensive materials. There is thus a need for a capsule lamp having the metal base fixed to the outer envelope without glue or cement.

Small portions of the threaded base have also been peened into slots formed in the lamp envelope. Peening requires that the lamp be properly oriented, so the peenings properly complement the preformed envelope slots. Alignment of peening apparatus and envelope slots consumes time, and machinery is required to properly execute such alignment. Peening regularly results in broken product, where the peening strike is excessive. Alternatively, less peening force can yield lamps with bases that loosen. There is thus a need for a lamp with a mechanically sealed envelope and base connection that does not require alignment of peening apparatus and envelope slots.

Hand assembly of lamps does not usually lead to strong mechanical couplings between bases and envelopes. On the other hand, a lamp envelope, being made of glass, necessarily is fragile, and a mechanical coupling made by a machine often leads to fracture of the lamp envelope, and wasted product. There is then a need for a machine-made mechanical coupling between the outer envelope of a capsule lamp and a threaded metal base, which coupling reduces or eliminates waste through fracturing of envelopes.

Examples of the prior art are shown by the following U.S. patents:

U.S. Pat. No. 3,194,625 issued to G. K. Danko on Jul. 13, 1965, for an Electric Lamp with Unitary Inner Envelope and Stem Assembly and Manufacturing Thereof, shows a threaded base lamp with an internal capsule integral with an outer envelope. The threaded base is cemented to the outer envelope.

U.S. Pat. No. 3,243,634 issued to F. A. Mosby on Mar. 29, 1966, for an Electric Lamp and Support Web, shows a threaded base lamp with an internal capsule supported from the threaded base. The threaded base is cemented to the outer envelope with an epoxy.

U.S. Pat. No. 4,657,809 issued to R. G. Blaisdell et al. on Mar. 3, 1987, for Electric Lamp with Self-Mounting Frame-Assembly and Method of Constructing Same, shows a threaded base lamp with an internal capsule. The internal capsule is supported on a wire frame that has spiked ends bent around the opening of the outer envelope. The threaded base is threaded to the outer envelope, causing the spiked ends to be compressed and pointed into the base. The spikes resist unthreading of the base from the outer envelope.

U.S. Pat. No. 4,959,583 issued to Vito J. Arsens et al., on Sep. 25, 1990, for Reflective Lamps Having An Improved Light Source Mounting Arrangement, shows a threaded base lamp with an internal capsule. The threaded base is coupled to the outer envelope by a high temperature resistive adhesive.

SUMMARY OF THE INVENTION

Accordingly, an object of the present invention is to provide an electric lamp assembly of the tungsten halogen type, which assembly includes a support frame which centers the inner capsule within the outer envelope, which support frame is unlikely to sway or be distorted, and which assembly includes a threaded base portion which is mechanically sealed to the glass envelope without requiring glue or cement, and without fracturing of the glass envelope.

With the above and other objects in view, as will hereinafter appear, a feature of the present invention is the provision of an electric lamp assembly with a threaded base portion, the assembly comprising a lamp envelope having a wall defining an enclosed chamber, a tubular end defining an opening to the enclosed chamber, and having a series of prominences encircling the tubular end, the prominences defining a series of corresponding concavities respectively intermediate respective pairs of prominences, the threaded base portion being coupled to the tubular end of the lamp envelope, the threaded base portion having thereon an end ring extending at least partially into the envelope tubular end concavities, and a light source enclosed in the lamp envelope having an electrical lead in contact with the threaded base.

The above and other features of the invention, including various novel details of construction and combinations of parts, will now be more particularly described with reference to the accompanying drawings and pointed out in the claims. It will be understood that the particular devices embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENTS

Figure 1:
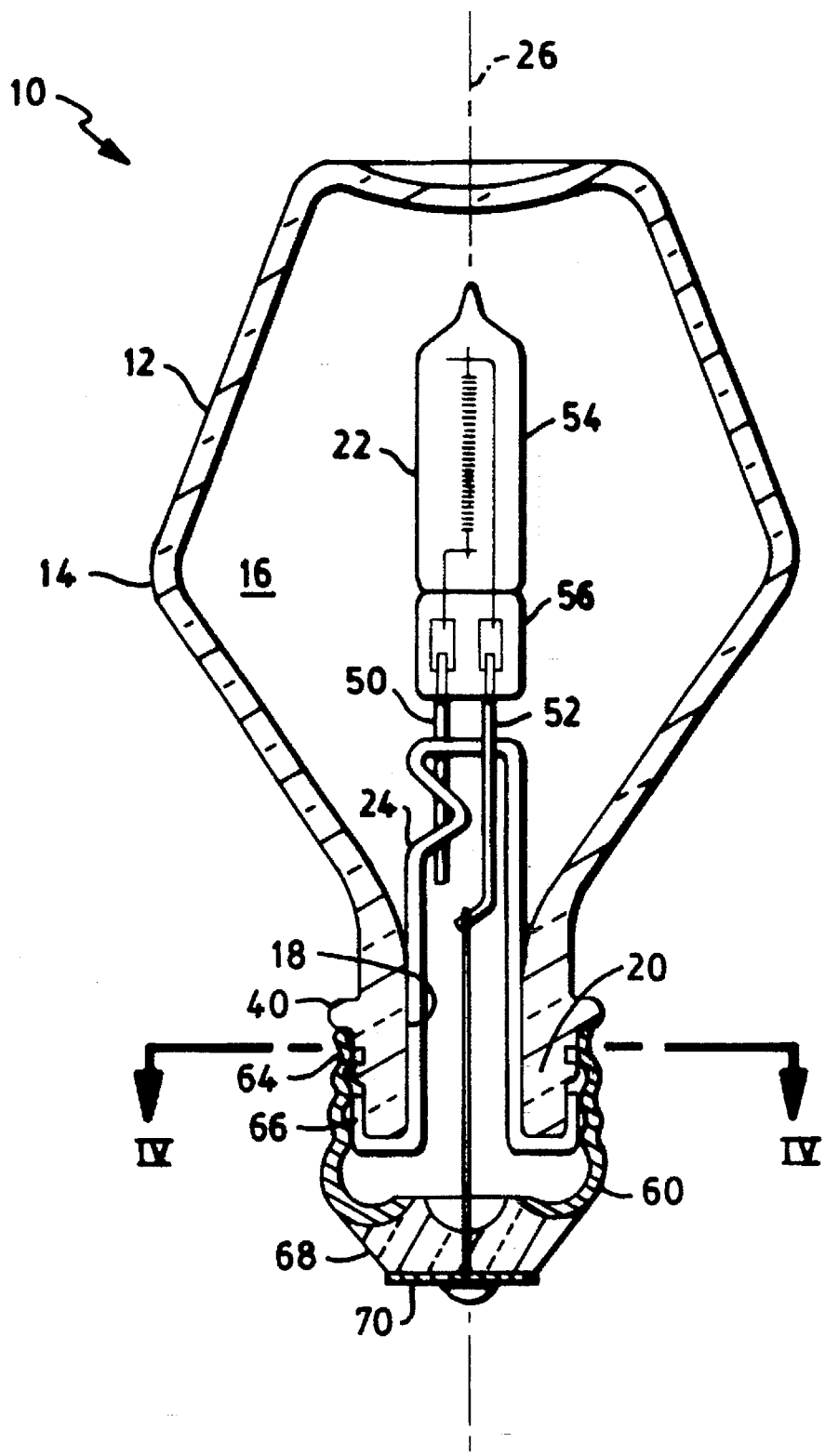
FIG. 1 is a sectional view of one form of electric lamp assembly illustrative of a preferred embodiment of the invention.
Figure 2:
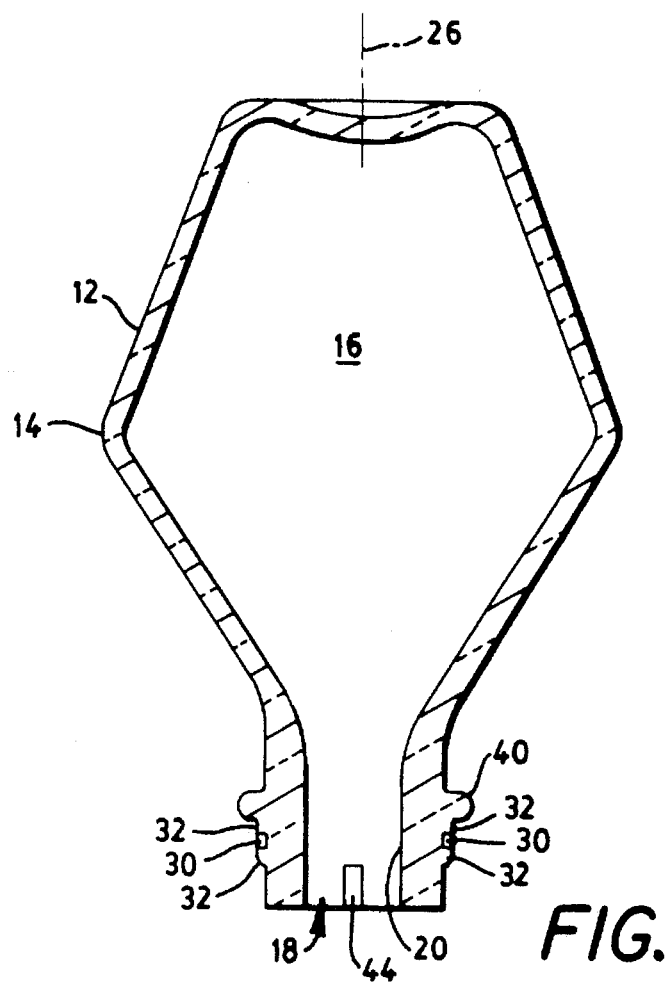
FIG. 2 shows a sectional view of a lamp envelope portion of the assembly of FIG. 1.

Referring to FIG. 1, it will be seen that an illustrative embodiment of an electric lamp assembly 10 includes a lamp envelope 12 and a light source 22 mounted within the envelope 12.

The lamp envelope 12 may be of quartz, glass, or any other suitable light transmissive material. The preferred material is glass. The lamp envelope 12 includes a wall 14 defining an enclosed chamber 16 and an opening 18 at a generally tubular end 20. The wall 14 preferably defines a standard light bulb, or an A-line bulb. The enclosed chamber 16 is sufficiently large to house the light source 22, such as a tungsten halogen light capsule, or an arc discharge capsule, and a support frame 24.

Formed as a portion of the lamp envelope 12, extending from the enclosed chamber 16, and ending at the opening 18, the tubular end 20 is aligned along a lamp axis 26. The tubular end 20 may be provided with a constant or variable diameter along the axial length at any selected point along its axial length. The preferred tubular end 20 is provided with a circular cross section, and a constant or decreasing diameter as the opening 18 is approached from the enclosed chamber 16.

Figure 3:
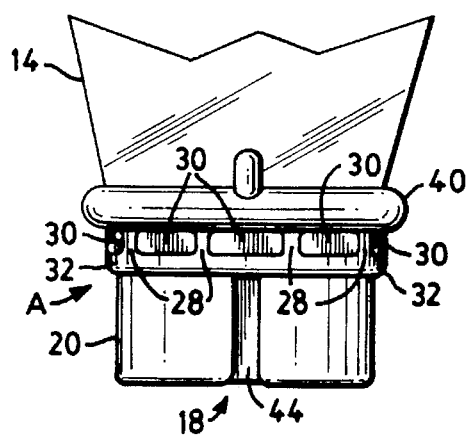
FIG. 3 is a side elevational view of a lamp envelope tubular end portion.
Figure 4:
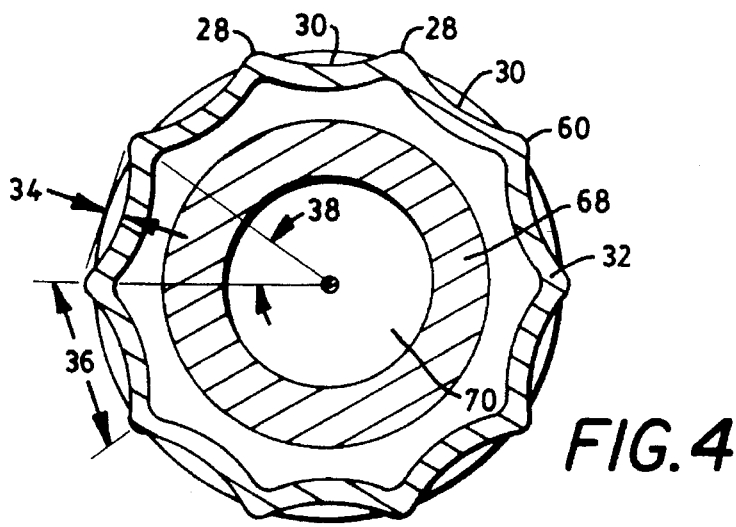
FIG. 4 is a sectional view taken along line IV—IV of FIG. 1.

Referring to FIGS. 3 and 4, it will be seen that circularly distributed around the tubular end 20 are a series of prominences 28 defining therebetween a series of intermediate concavities 30 (FIG. 3). The prominences 28 and intermediate concavities 30 are distributed around a collar portion 32 of the tubular end 20, in a plane normal to the axial cross section of the tubular end 20. The preferred prominences 28 are a regularly spaced series of rounded peak bumps disposed in circular fashion around the tubular end 20. The prominences 28 define the series of intermediate concavities 30. Between two sequential prominences 28 is a concavity 30, and adjacent a prominence 28, on either side thereof, are two concavities 30.

Figure 5:
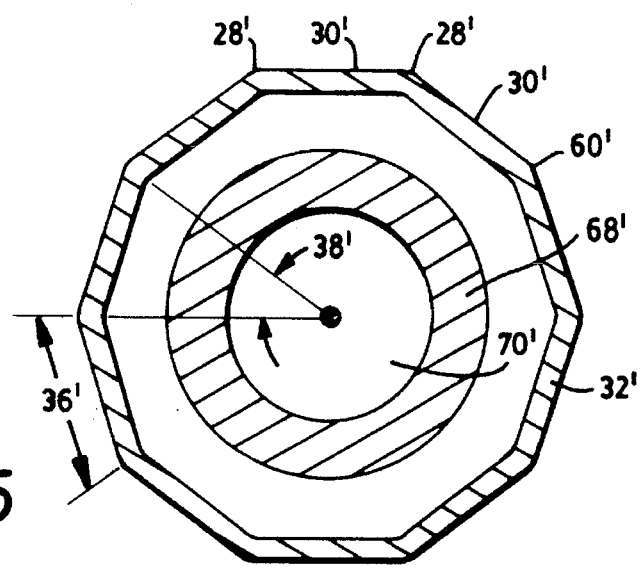
FIGS. 5 and 6 are similar to FIG. 4, but illustrative of alternative embodiments of the invention.

Referring to FIG. 5, it will be seen that the concavities may be formed alternatively as flat planes 30' between prominences 28' giving the cross section of collar portion 32' something of a polygonal form. Making the concavities 30' flatter, or less deep, enhances the sealing contact between lamp envelope 12 and a threaded base, but is believed to reduce the resistance of the base to unthreading.

Figure 6:
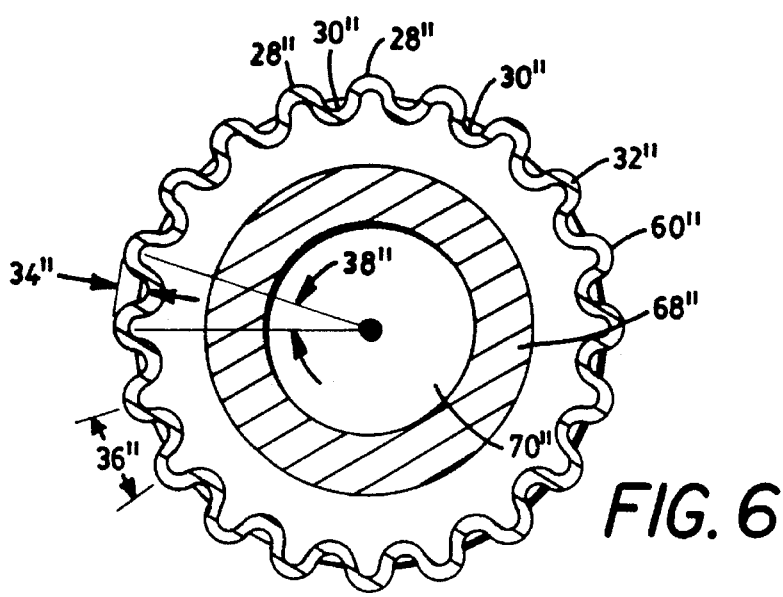

The concavities may be indented further, as deep indentations 30" (FIG. 6), so that collar portion 32" has a geared, or splined form. In FIG. 6 are shown concavities 30" and prominences 28" with deep sinusoidal indentations forming a gear-like pattern. Increasing the depth of the cavitations 30" is thought to increase the resistance of a base to unthreading, but reduces the sealing contact between the lamp envelope 12 and a threaded base. The concavities 30, 30' and 30" have sufficient depth 34 and width 36 to receive an indented portion of an adjacent threaded base to be described hereinafter. A radial angle 38 of 15 or more degrees subtending each concavity 30 is preferred.

Figure 7:
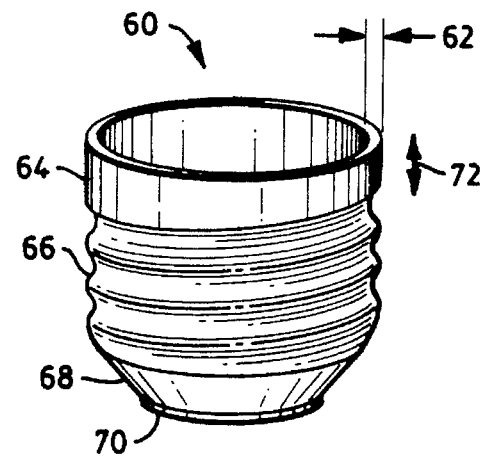
FIG. 7 is a perspective view of a threaded base portion of the assembly of FIG. 1.

In a preferred embodiment, ten or twelve prominences 28 are formed around the collar portion 32 of the tubular end 20, similarly forming ten or twelve intermediate concavities 30 with radial angles 38 of from 15 to 18 degrees each. The preferred concavities 30 have smooth concave faces. The preferred prominences 28 have a peak dimension 34 that preferably is greater than the wall thickness 62 of the threaded base (FIG. 7).

In the preferred embodiment, adjacent the collar portion 32, the ring of prominences 28 and concavities 30, on a side of the collar portion away from the opening 18 is a circular rib 40 (FIG. 3). Lead troughs 44 are molded in the tubular end 20, extending from the opening 18, across the tubular end 20, towards the circular rib 40, and ending adjacent the collar portion 32. The lead troughs 44 have a width and depth sufficient to receive a light source lead, or leg of the support frame 24, to be trapped between the lamp envelope 12 and the lamp base 60, thereby making a secure electrical connection to the threaded base 60.

By way of example, the lamp envelope 12 is shown in the drawings as a conventional bulb with the tubular end 20 formed thereon. Formed on the tubular end 20 are ten rounded prominences 28 distributed equiangularly (36 degrees) around the collar portion 32 of the tubular end 20. Intermediate the prominences 28 are ten smooth surfaced concavities 30. The tubular end 20 is additionally molded with lead troughs 44. The lamp envelope 12 need not necessarily include a lead trough 44, as the light source lead may be soldered, pinched to, or otherwise electrically coupled to, the threaded base 60.

The light source 22 may be of any selected form with two exposed electric leads 50, 52 (FIG. 1). The lamp envelope 12 encloses the light source 22, along with the support frame 24, if a frame support is used. The threaded base 60 seals the light source 22 in the enclosed chamber 16, and electrically connects to the lamp lead. By way of example, the light source 22 is shown as a single ended tungsten halogen capsule 54 with a press sealed quartz tube 56, and the two electric leads 50, 52 extending from the press seal. One lead 50 is connected to the support frame 24 that is, in turn, connected to the threaded base 60 side wall contact. The other lead 52 may be connected to a center contact 70 (FIG. 1). Other suitable light sources may be used, such as a double ended tube, a high intensity arc discharge source, or a low intensity source.

The threaded base 60 is illustrated in FIG. 7. The threaded base 60 may be made of brass, aluminum, or other malleable and conductive metals, to have the general form of a cup with a threaded side wall. The tubular end 20 of the lamp envelope 12 slidingly receives the threaded base 60. The preferred threaded base 60 has an end ring 64, a base threading 66 formed in a side wall, an insulating ring 68, and the center contact 70. The end ring 64 of the threaded base 60 has an axial extension 72 sufficient to span at least a portion of the collar portion 32 with the ring of prominences 28 and concavities 30, when the lamp envelope 12 is properly positioned in the threaded base 60. The preferred threaded base 60 has an internal diameter sufficient to slidingly mate with the tubular end 20 of the lamp envelope 12 while entrapping a light source lead, or leg of the support frame 24 in a lead trough 44. The preferred end ring 64 is a right circular tube, having an internal diameter substantially the same as the external diameter of the collar member ring of peaks of the prominences 28, and having an axial length equal or greater than the axial length of the ring of prominences 28 and concavities 30. The end ring 64 closely fits upon, and covers the ring of prominences 28 and concavities 30. Positioned along the exterior side wall of the threaded base 60 is the base threading 66, sized to fit a lamp socket. In the preferred threaded base 60, positioned at the end of the threaded base 60 around the axis 26 is the insulating ring 68, and positioned at the end of the threaded base 60 at the axis 24 is the center contact 70. The insulating ring 68 may be of glass, and the center contact 70 may be a metal eyelet. The insulating ring 68 and center contact 70 form the standard center contact, typical of common light bulbs.

An electric lamp 10 with a threaded base may be assembled by performing the following steps. First, a glass lamp envelope 12 is molded having the above-mentioned envelope features. Similarly, a threaded base 60, such as a brass base, is made, also with the above-mentioned base features. In the preferred procedure, the legs of the support frame 24 are bent to form hooks, and one lead 50 of the light source 22 is welded to the support frame 24. The light source 22 and support frame 24 unit is then inserted in the lamp envelope 12, with the hooked support frame legs positioned in the lead troughs 44. The second lead 52 extends axially out of the enclosed chamber 16, through opening 18. The threaded base 60 is then slid over the second lead, so the second lead passes through the eyelet forming the center contact 70. The threaded base 60 is then slid over the lamp envelope tubular end 20, trapping the legs of the support frame 24 in the lead troughs 44 in contact with the threaded base 60 side wall. The threaded base 60 is threaded forward until the end ring 64 is aligned to cover the ring of prominences 28 and concavities 30 of the lamp envelope 12. Sliding the base onto the lamp envelope 12 may cause the inside portions of the base threads 66 to press progressively harder against the legs of the support frame 24 in the lead troughs 44, thereby forming a hard-pinched contact between the threaded base 60 and the trapped support frame legs. The second lead 52 is then soldered to the eyelet forming the center contact 70, and any excess lead is trimmed appropriately, if needed.

Figure 8:
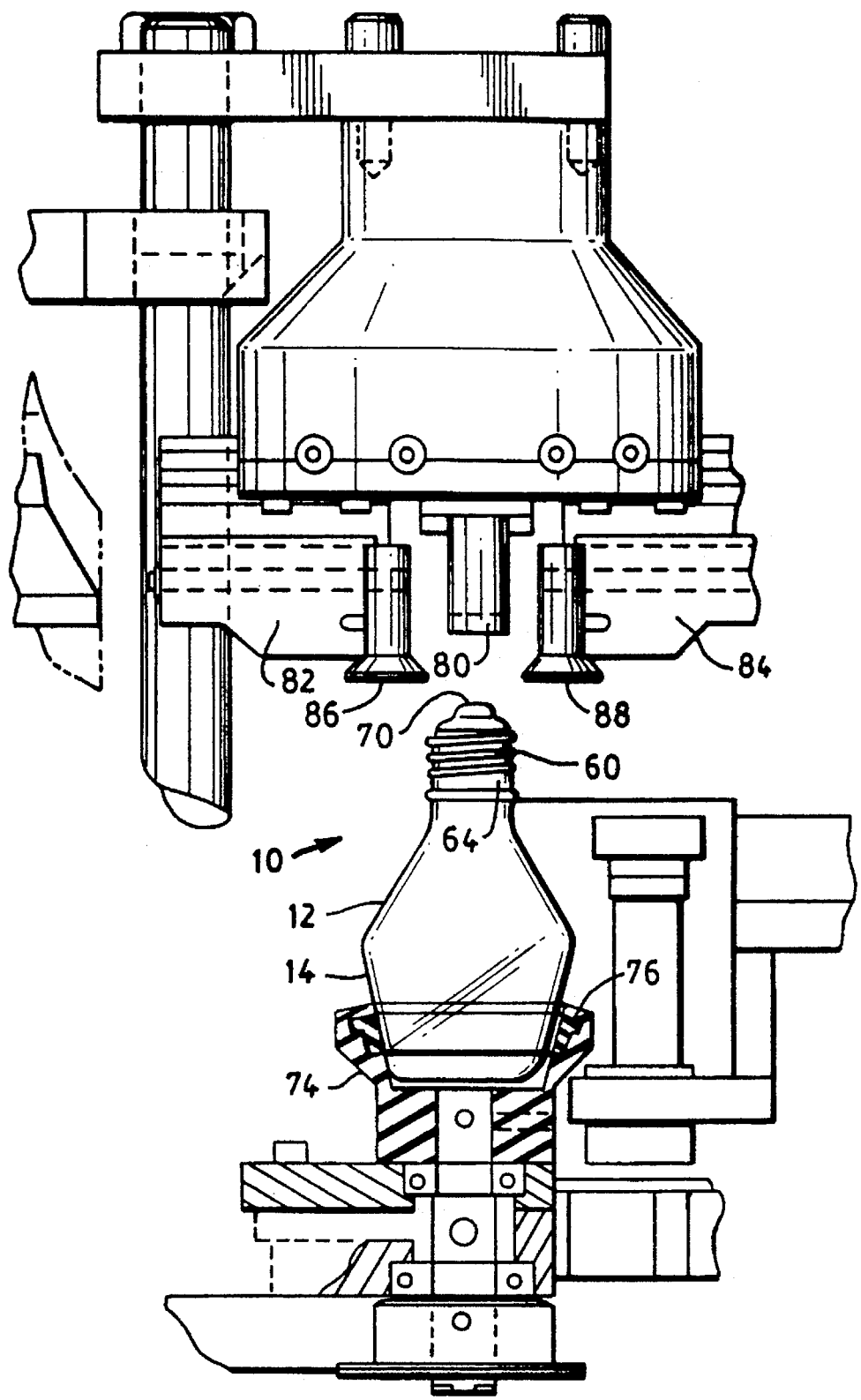
FIG. 8 is a side elevational view of equipment for roller sealing an electric lamp prior to a sealing operation.
Figure 9:
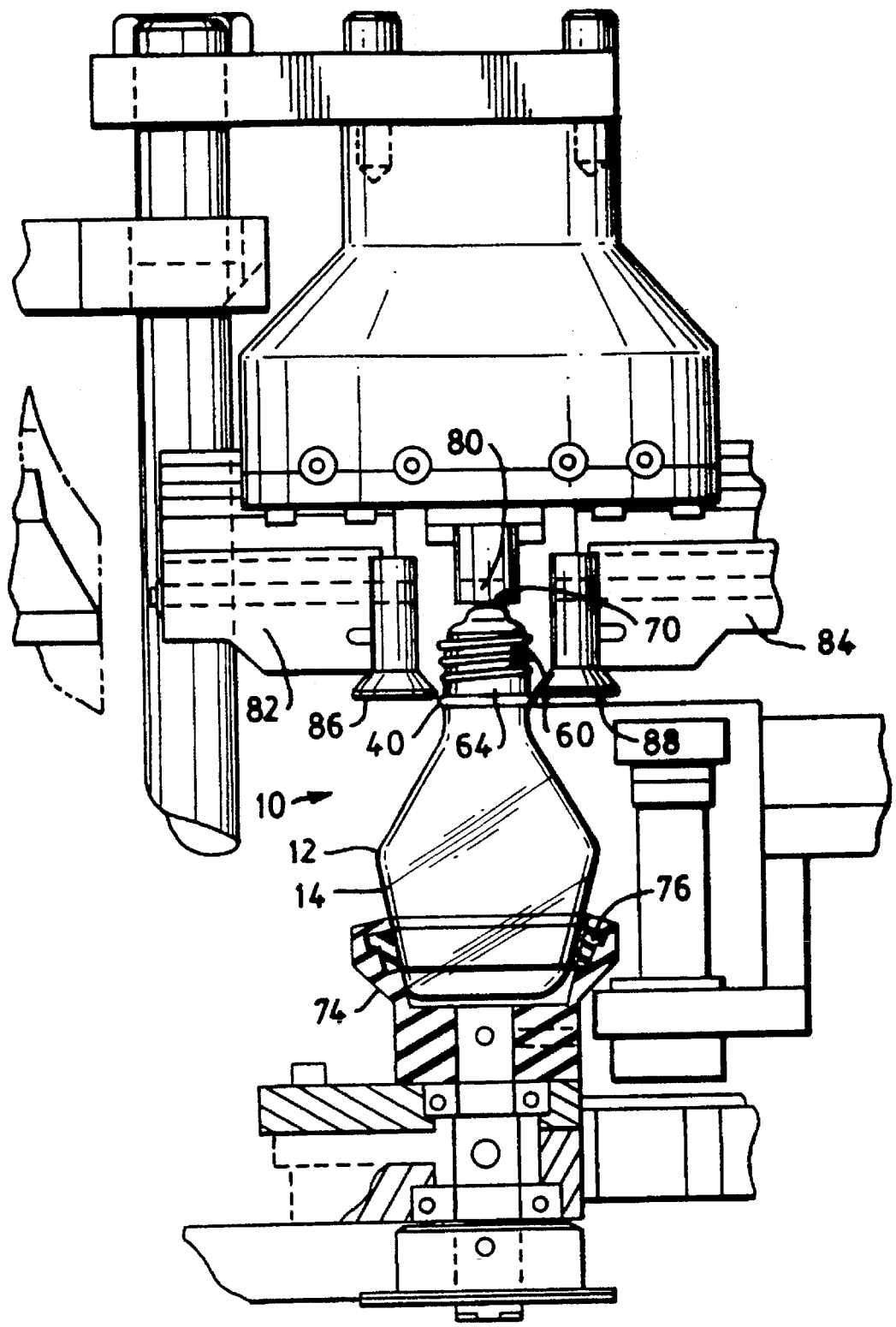
FIG. 9 is a side elevational view of the equipment of FIG. 8, shown in the sealing operation.

The lamp envelope 12, with the threaded base 60 in position, may then be held coaxially in a rotatable cup 74 (FIGS. 8 and 9). In FIG. 8, there is illustrated equipment for roller sealing an electric lamp, the equipment being shown prior to the sealing operation. The preferred cup 74 includes a rubber grip 76 to frictionally grasp the lamp envelope 12. A roller sealing assembly is then advanced from the position shown in FIG. 8 until a rotating contact 80 engages the center contact 70 of the threaded base 60 (FIG. 9).

As may be seen in FIG. 9, with the lamp envelope 12 and threaded base 60 rotating in the cup 74, swing arms 82, 84 are advanced to move pressing wheels 86, 88 against the threaded base 60 along the end ring 64. The pressing wheels 86, 88 are aligned to contact diametric sides of the threaded base 60 and end ring 64 with sufficient pressure to press the end ring 64 against the lamp envelope 12 along the prominences 28, and down into the concavities 30. The lamp envelope 12 and threaded base 60 are then rotated, while pressure from the pressing wheels 86, 88 forces the end ring 64 against the prominences 28, and into the concavities 30. The end ring 64 is thereby trapped in the concavities 30 and the threaded base 60 is sealed to the lamp envelope 12, and has high resistance to unthreading of the threaded base 60 from the lamp envelope 12. Epoxy need not be used in the lamp envelope to threaded base coupling. Tests have been performed that indicate the roller sealed threaded base 60 is not easily unthreaded from the lamp envelope 12 with ordinary human strength. Further, it has been found that over time a reaction occurs between the glass of the envelope 12 and the metal of the threaded base 60, which actually strengthens the bond therebetween.

In a preferred embodiment, the lamp envelope 12 is of glass, and is provided with the wall 14, the enclosed chamber 16, the tubular end 20, and ten prominences 28 and intermediate concavities 30 formed on the collar portion 32. The tubular end is provided with an outside diameter of 25.0 millimeters (0.985 inch). The concavities are about 2.235 millimeters (0.088 inches) wide. Adjacent the collar portion is the circular rib 40, about 3.2 millimeters (0.126 inch) axially wide. The lamp envelope has two leads troughs, diametrically positioned, each about 1.65 millimeter (0.065 inch) wide, 0.86 millimeters (0.034 inch) deep, and 7.34 millimeters (0.289 inch) axially long. The threaded base is of brass, and has a tubular end with an end ring 27.0 millimeters in diameter (1.075 inch), an insulator ring 15.62 millimeters in diameter (0.615 inch), and an eyelet-like center contact 10.0 millimeters in diameter (0.40 inch) and threading.

There is thus provided an electric lamp assembly including a support frame which centers the inner capsule in the outer envelope and which requires low assembly torque, but is unlikely to sway or be distorted in assembly. There is further provided a capsule lamp having a metal base fixed to an outer envelope by a mechanical seal not requiring the application of glue or cement, which mechanical seal can be rendered by machine without undue loss or waste through fractures of envelopes.

It is to be understood that the present invention is by no means limited to the particular construction herein disclosed and/or shown in the drawings, but also comprises any modifications or equivalents within the scope of the claims.

Having thus disclosed our invention, what we claim as new and desire to secure by Letters Patent of the United States is:

1. An electric lamp assembly comprising:
   a) a lamp envelope having a wall defining a substantially enclosed chamber, a tubular end extending from said wall and defining an opening to said chamber, a collar portion extending from an outer surface of said tubular end, and a series of prominences extending outwardly from said collar portion, said prominences defining therebetween a series of corresponding concavities, each of said concavities being disposed between a pair of said prominences,
   b) a threaded base fixed to said tubular end of said lamp envelope, said threaded base having an end ring in close contact with the prominences and extending at least partially into said concavities to bind said base to said envelope, and having external threading for attachment of said assembly to a socket, and
   c) a light source disposed in said chamber and having electrical leads in contact with said threaded base and with a contact fixed on a free end of said base.

2. The electric lamp assembly in accordance with claim 1, and further comprising a circular rib extending outwardly from said tubular end, said circular rib being adjacent said collar portion and adjacent an end of said threaded base.

3. The electric light assembly in accordance with claim 2 wherein said tubular end is smooth-walled and cylindrically configured to slidingly receive said threaded base in assembly, an end of said threaded base abutting said circular ring.

4. The electric lamp assembly in accordance with claim 1 wherein said prominences and said concavities are arranged on said collar portion in annular fashion about an axis of said lamp and are disposed in a plane transverse to said axis.

5. The electric lamp assembly in accordance with claim 4, and further comprising a circular rib extending radially outwardly from said tubular end further than said collar portion and said prominences on said collar portion, said circular rib being adjacent said collar portion and adjacent an end of said threaded base.

6. The electric light assembly in accordance with claim 5 wherein said tubular end is smooth-walled and cylindrically configured to slidingly receive said threaded base, and said circular rib serves to stop said sliding movement of said tubular end by a free edge of said tubular end abutting said circular rib, in assembly.

7. The electric lamp assembly in accordance with claim 1, wherein said series of prominences comprises more than five prominences, and said series of concavities forms an equal number of concavities as prominences.

8. The electric lamp assembly in accordance with claim 1, wherein each of said concavities is subtended by a radial angle of more than 15 degrees.

9. The electric lamp assembly in accordance with claim 1, wherein a radial difference between a bottom of one of said concavities and a height of one of said prominences is greater than a wall thickness of said threaded base.

10. The electric lamp assembly in accordance with claim 1, wherein said prominences have rounded tops.

11. The electric lamp assembly in accordance with claim 1, wherein said concavities have smoothly rounded surfaces.

* * * * *